United States Patent [19]

Seiler et al.

[11] Patent Number: 4,507,236

[45] Date of Patent: Mar. 26, 1985

[54] FIBRE-REACTIVE DYES, CONTAINING BOTH CHLORO AND FLUORO TRIAZINE RADICALS

[75] Inventors: Herbert Seiler, Riehen; Gert Hegar, Schönenbuch, both of Switzerland

[73] Assignee: Ciba-Geigy Corporation, Ardsley, N.Y.

[21] Appl. No.: 452,974

[22] Filed: Dec. 27, 1982

Related U.S. Application Data

[63] Continuation of Ser. No. 283,414, Jul. 15, 1981, abandoned, which is a continuation of Ser. No. 141,453, Apr. 18, 1980, abandoned, which is a continuation of Ser. No. 037,591, May 9, 1979, abandoned, which is a continuation of Ser. No. 742,810, Nov. 18, 1976, abandoned.

[30] Foreign Application Priority Data

Nov. 25, 1975 [CH] Switzerland ............................ 15256
Oct. 25, 1976 [CH] Switzerland ............................ 13450

[51] Int. Cl.³ .................. C09B 62/08; C09B 62/085; C09B 62/09; C09B 62/095
[52] U.S. Cl. .................................. 534/634; 534/618; 534/624; 534/631; 534/803
[58] Field of Search ............................ 260/153, 46 T

[56] References Cited

U.S. PATENT DOCUMENTS 3,966,705  6/1976  Oesterlein et al. ................... 260/153
4,069,218  1/1978  Hegar ................................. 260/153

FOREIGN PATENT DOCUMENTS 1019771  2/1966  United Kingdom ................ 260/153
1327301  8/1973  United Kingdom ................ 260/153

Primary Examiner—Floyd D. Higel
Attorney, Agent, or Firm—Joseph G. Kolodny

[57] ABSTRACT

Fibre-reactive dyes of the formula

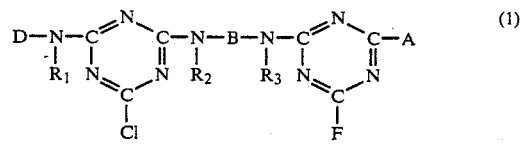

wherein D is the radical of a benzene or naphthalene azo dye which contains sulpho groups, each of $R_1$, $R_2$ and $R_3$ is a hydrogen atom, B is an arylene group and A is an amino group.

2 Claims, No Drawings

FIBRE-REACTIVE DYES, CONTAINING BOTH CHLORO AND FLUORO TRIAZINE RADICALS

This is a continuation of application Ser. No. 283,414 filed on July 15, 1981 (now abandoned), which is a continuation of Ser. No. 141,453, filed Apr. 18, 1980, now abandoned; which is a continuation of Ser. No. 037,591 filed May 9, 1979, now abandoned; which is a continuation of Ser. No. 742,810 filed Nov. 18, 1976, now abandoned.

The present invention provides fibre-reactive dyes of the formula

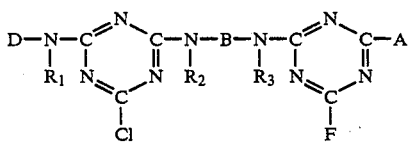

wherein D is the radical of an organic dye which contains sulpho groups, each of $R_1$, $R_2$ and $R_3$ independently is a hydrogen atom or an alkyl group of 1 to 4 carbon atoms, B is an alkylene or arylene group and A is an amino, alkoxy or alkylthio group.

The radical D is in particular the radical of a dye which contains sulpho groups of the mono- or polyazo, metal complex, formazane, anthraquinone, phthalocyanine, stilbene, oxazine, dioxazine, triphenylmethane, nitro, or azomethine series. Possible $C_1$–$C_4$-alkyl groups represented by $R_1$, $R_2$ and $R_3$ are: methyl, ethyl, propyl, iso-propyl, butyl, isobutyl, sec. butyl and tert. butyl groups. The group B is an alkylene group of 2 to 6 carbon atoms or primarily a group of the benzene, naphthalene, diphenyl or stilbene series. The arylene group B can contain further substituents, for example alkyl groups, such as methyl, ethyl and propyl groups, alkoxy groups, such as methoxy and ethoxy groups, carboxy and sulpho groups, and halogen atoms, such as fluorine, chlorine and bromine atoms. Suitable examples of amino groups for the group A are: —$NH_2$, hydroxylamino, hydrazino, phenylhydrazino, sulphophenylhydrazino, methylamino, ethylamino, propylamino, isopropylamino, butylamino, β-methoxyethylamino, γ-methoxypropylamino, N,N-dimethylamino, N,N-diethylamino, N-methyl-N-phenylamino, N-ethyl-N-phenylamino, β-chloroethylamino, β-hydroxyethylamino, γ-hydroxypropylamino, benzylamino, cyclohexylamino, morpholino, piperidino, piperazino, and chiefly aromatic amino groups, such as phenylamino toluidino, xylidino, chloroanilino, anisidino, phenetidino, 2-, 3- and 4-sulphoanilino, 2,5-disulphoanilino, sulphomethylanilino, N-sulphomethylanilino, 3- and 4-carboxyphenylamino, 2-carboxy-5-sulphophenylamino, 2-carboxy-4-sulphophenylamino, 4-sulphonaphthyl(1)-amino, 3,6-disulphonaphthyl(1)-amino, 3,6,8-trisulpho-naphthyl(1)-amino, and 4,6,8-trisulphonaphthyl(1)-amino. Suitable alkoxy groups represented by A are: methoxy, ethoxy, propyloxy, iso-propyloxy, butyloxy, β-methoxyethoxy, β-ethoxyethoxy, γ-methoxypropoxy, γ-ethoxypropoxy, γ-propoxypropoxy, γ-isopropoxypropoxy groups. Suitable alkylthio groups represented by A are: methylthio and ethyl thio groups.

Preferred fibre-reactive dyes are those of the formula (1), wherein D is the radical of an organic dye which contains sulpho groups, $R_1$, $R_2$ and $R_3$ are hydrogen atoms, B is an arylene group which contains at least one sulphonic acid group, and A is an amino group.

An amino group in the definition of A is to be understood as meaning throughout this specification not only the $H_2N$ group, but also a substituted amino group, for example a methylamino, diethylamino, β-hydroxyethylamino, phenylamino, sulphophenylamino, naphthylamino group or also a cyclic amino group, for example the piperidino or morpholino group.

The invention provides in particular fibre-reactive dyes of the formula (1), wherein D is the radical of an azo dye which contains sulpho groups, $R_1$, $R_2$ and $R_3$ are hydrogen atoms, B is a phenylene group which contains one or two sulpho groups, and A is an amino group.

Among the fibre-reactive dyes of the formula (1) which contain the radical of an azo dye which contains sulpho groups, particularly preferred dyes are those wherein D is the radical of an azo dye which contains sulpho groups and belongs to the H-acid or I-acid series, each of $R_1$, $R_2$ and $R_3$ independently is a hydrogen atom or a $C_1$–$C_4$-alkyl group, B is a sulphophenyl group and A is an amino group.

The fibre-reactive dyes of the formula

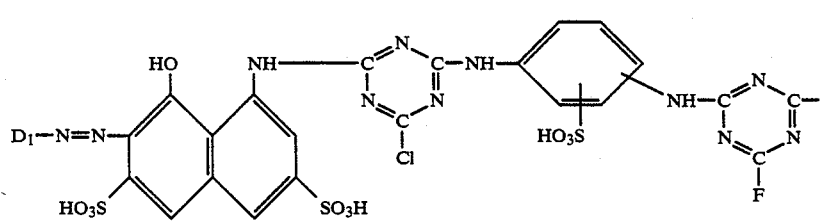

wherein $D_1$ is the radical of a diazo component of the benzene or naphthalene series and A is an amino group, constitute an important group.

Preferred dyes of the type represented by formula (2) are the fibre-reactive dyes of the formula

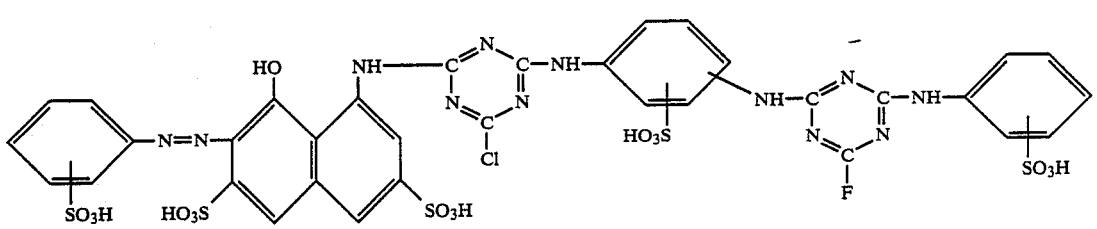 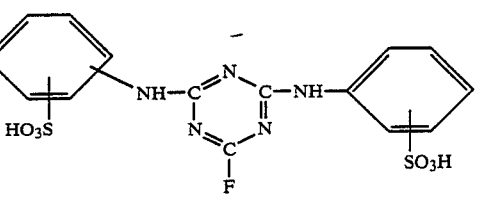 (3)

Since the dyes of the formula (1) contain two removable halogen atoms, Cl and F, they are fibre-(bi)reactive.

By fibre-reactive compounds are meant those compounds which are able to react with the hydroxy groups of cellulose or with the amino groups of natural or synthetic polyamides to form covalent chemical bonds.

The fibre-reactive dyes of the formula (1) are obtained by condensing an organic dye which contains sulpho groups of the formula

 (4)

wherein D and $R_1$ are as defined in formula (1), 2,4,6-trichloro-1,3,5-triazine of the formula

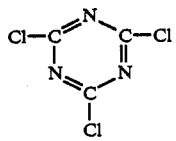 (5)

an alkylene- or arylenediamine of the formula

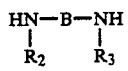 (6)

wherein $R_2$, $R_3$ and B are as defined in formula (1), 2,4,6-trifluoro-1,3,5-triazine of the formula

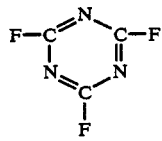 (7)

and a compound of the formula

H—A (8)

wherein A is as defined in formula (1), to give a fibre-reactive dye of the formula (1).

Since the individual process steps can be carried out in varying sequence, if appropriate also in part simultaneously, different modifications of the process are possible. The starting materials to be used for each partial reaction result from formula (1). In general, the reaction is carried out stepwise in succession and in this case the sequence of the simple condensation reactions between the individual reaction components of the formulae (4) to (8) can be freely chosen.

Preferably, compounds of the formulae (4) to (8) are used as starting materials, wherein D is the radical of an organic dye which contains sulpho groups, $R_1$, $R_2$ and $R_3$ are hydrogen atoms, B is an arylene group which contains at least one sulphonic acid group, and A is an amino group.

A preferred embodiment of the process for obtaining fibre-reactive dyes of the formula (1) comprises the use of starting materials of the formulae (4) to (8), wherein D is the radical of an azo dye which contains sulpho groups, $R_1$, $R_2$ and $R_3$ are hydrogen atoms, B is a phenylene group which contains one or two sulpho groups, and A is an amino group.

In particular, starting materials of the formulae (4) to (8) are used, wherein D is the radical of an azo dye which contains sulpho groups and belongs to the H-acid or I-acid series, each of $R_1$, $R_2$ and $R_3$ independently is a hydrogen atom or an alkyl group of 1 to 4 carbon atoms, B is a sulphophenyl group and A is an amino group.

In accordance with a modification of the above described process, the fibre-reactive dyes of the formula (1), wherein D is the radical of an organic dye which is composed of two or more than two components, can be manufactured by reacting the components of the radical D, which together contain at least one sulpho group, and one of the components contains a

group, wherein $R_1$ is as defined in formula (1), 2,4,6-trichloro-1,3,5-triazine of the formula (5), an alkylene- or arylenediamine of the formula (6), wherein $R_2$, $R_3$ and B are as defined in formula (1), 2,4,6-trifluoro-1,3,5-triazine of the formula (7) and a compound of the formula (8), wherein A is as defined in formula (1), to give the end fibre-reactive dye of the formula (1).

Examples of such organic dyes which are composed of two or more than two components are: monoazo, disazo, trisazo, tetrazo, metal complex, formazane and azomethine dyes.

The above described process modification is chiefly of importance for the manufacture of fibre-reactive dyes of the formula (1), wherein D is the radical of an azo dye which contains sulpho groups. In these dyes, that part of the azo radical to which the chloro-s-triazine radical is directly attached can either be the radical of the diazo component or the radical of the coupling component. In this way, two possibilities of the above described modification of the process for the manufacture of fibre-reactive dyes of the formula (1), wherein D is the radical of an azo dye which contains sulpho groups, ensue. Both these modifications of the process for the manufacture of fibre-reactive dyes of the formula (1), wherein D is the radical of an azo dye which contains sulpho groups, comprise (a) reacting a diazotisable aromatic diamine which contains a

group, wherein $R_1$ is as defined in formula (1), a coupling component, said diazotisable diamine and said coupling component containing at least one sulpho group, 2,4,6-trichloro-1,3,5-triazine of the formula (5), an alkylene- or arylenediamine of the formula (6), wherein $R_2$, $R_3$ and B are as defined in formula (1), 2,4,6-trifluoro-1,3,5-triazine of the formula (7) and a compound of the formula (8), wherein A is as defined in formula (1), by diazotisation, coupling and condensation, to give the end fibre-reactive dye of the formula (1), or (b) reacting a coupling component which contains a

group, wherein $R_1$ is as defined in formula (1), a diazotisable amine containing at least one sulpho group, 2,4,6-trichloro-1,3,5-triazine of the formula (5), an alkylene- or arylenediamine of the formula (6), wherein $R_2$, $R_3$ and B are as defined in formula (1), 2,4,6-trifluoro-1,3,5-triazine of the formula (7) and a compound of the formula (8), wherein A is as defined in formula (1), by diazotisation, coupling and condensation, to give the end fibre-reactive dye of the formula (1).

A preferred embodiment of both modifications (a) and (b) is that wherein the starting materials are a diazotisable aromatic diamine which contains a

group, wherein $R_1$ is a hydrogen atom, a coupling component, said diazotisable diamine and said coupling component together containing at least one sulpho group, 2,4,6-trichloro-1,3,5-triazine of the formula (5), an arylenediamine of the formula (6), wherein each of $R_2$ and $R_3$ is a hydrogen atom and B is a phenylene group which contains one or two sulpho groups, 2,4,6-trifluoro-1,3,5-triazine of the formula (7) and a compound of the formula (8), wherein A is an amino group, or wherein the starting materials are a coupling component which contains a

group, wherein $R_1$ is a hydrogen atom, a diazotisable aromatic amine, said coupling component and said diazotisable diamine together containing at least one sulpho group, 2,4,6-trichloro-1,3,5-triazine of the formula (5), an arylenediamine of the formula (6), wherein each of $R_2$ and $R_3$ is a hydrogen atom and B is a phenylene group which contains one or two sulpho groups, 2,4,6-trifluoro-1,3,5-triazine of the formula (7) and a compound of the formula (8), wherein A is an amino group.

A further preferred embodiment comprises the use of a H-acid or I-acid which contains a

group, wherein $R_1$ is a hydrogen atom or an alkyl group of 1 to 4 carbon atoms, a diazotisable aromatic amino, 2,4,6-trichloro-1,3,5-triazine of the formula (5), an arylenediamine of the formula (6), wherein each of $R_2$ and $R_3$ is independently a hydrogen atom or an alkyl group of 1 to 4 carbon atoms and B is a sulphophenyl group, 2,4,6-trifluoro-1,3,5-triazine of the formula (7) and a compound of the formula (8), wherein A is an amino group.

The above described modifications (a) and (b) for the manufacture of fibre-reactive dyes of the formula (1), wherein D is the radical of an azo dye which contains sulpho groups, comprise individually a number of embodiments, for example:

1. A coupling component which contains an amino group is condensed with cyanuric chloride, the resultant primary condensation product is condensed with an alkylene- or arylenediamine, a diazo component is coupled to the secondary condensation product, the resultant azo compound is condensed with cyanuric fluoride and the condensation product thereby obtained is finally condensed with an amine.

2. The procedure described in (1) is carried out up to the manufacture of the azo compound. Cyanuric chloride is condensed with an amine (alcohol or alkylmercaptan) and the primary condensation product is condensed with the above azo compound.

3. The procedure of (1) is carried out up to the manufacture of the secondary condensation product from cyanuric chloride, a coupling component which contains an amino group and an alkylene- or arylenediamine. The secondary condensation product is condensed with cyanuric fluoride, the condensation product resulting therefrom is in turn condensed with an amine and a diazo component is coupled to this last obtained condensation product.

4. A coupling component which contains an amino group is condensed with cyanuric chloride, a diazo component is coupled to the primary condensation product and the azo compound obtained is condensed with an alkylene- or arylenediamine. The resultant condensation product is condensed with cyanuric fluoride and the condensation product resulting therefrom is then condensed with an amine.

5. A diazo component is coupled to a coupling component. The resultant azo compound, which contains an amino group in the radical of the diazo component or in the radical of the coupling component, is condensed with cyanuric chloride, and the primary condensation product is condensed further with an alkylene- or arylenediamine. The secondary condensation product thereby obtained is condensed with cyanuric fluoride and the condensation product resulting therefrom is then condensed with an amine.

Instead of condensing the secondary condensation product from cyanuric chloride, an azo compound and an alkylene- or arylenediamine with cyanuric fluoride and then with an amine (alcohol, phenol, alkylmercaptan or arylmercaptan), it is also possible to prepare the primary condensation product from cyanuric chloride and an amine (alcohol or alkylmercaptan) initially and then to condense it with the above secondary condensation product from cyanuric chloride, an azo compound and an alkylene- or arylenediamine.

6. An amine (alcohol or alkylmercaptan) is condensed with cyanuric fluoride and the primary condensation product is condensed with an alkylene- or arylenediamine. The resultant secondary condensation product is then condensed with cyanuric chloride. An azo compound which contains an amino group in the radical of the diazo component or in the radical of the coupling component is also prepared by coupling a diazo component to a coupling component. The azo compound is condensed with the intermediate first described.

This procedure is generally applicable, that is to say also to dyes of all other classes, by using instead of the azo compound any sulpho group-containing dye which contains an amino group.

7. The procedure as described in (6) is carried out up to the manufacture of the intermediate from amine (alcohol or alkylmercaptan), cyanuric fluoride, alkylene- or arylenediamine and cyanuric chloride. This intermediate is condensed with a coupling component which contains an amino group and a diazo component is coupled to the condensation product.

8. The procedure described in (6) is carried out up to the manufacture of the secondary condensation product from amine (alcohol or alkylmercaptan), cyanuric fluoride and alkylene- or arylenediamine. An azo compound which contains an amino group in the radical of the diazo component or in the radical of the coupling component, is also prepared by coupling a diazo component to a coupling component. The resultant primary condensation product is condensed with the above secondary condensation product.

This procedure is also generally applicable by using instead of the azo compound any sulpho group-containing dye which contains an amino group for the condensation with cyanuric chloride and condensing the primary condensation product with the secondary condensation product from amine (alcohol or alkylmercaptan), cyanuric fluoride and alkylene- or arylenediamine.

9. The procedure as described in (6) is carried out up to the manufacture of the secondary condensation product from amine (alcohol or alkylmercaptan), cyanuric fluoride and alkylene- or arylenediamine. Cyanuric chloride is further condensed with a coupling component which contains an amino group and the resultant primary condensation product is condensed with the above mentioned secondary condensation product and a diazo component is finally coupled to the condensation product last obtained.

10. The procedure as described in (6) is carried out up to the manufacture of the intermediate from amine (alcohol or alkylmercaptan), cyanuric fluoride, alkylene- or arylenediamine and cyanuric chloride. This intermediate is monocondensed with a diazo component which in addition to containing the diazotisable amino also contains a further amino group and the resultant condensation product is diazotised and coupled to a coupling component.

According to the procedure described in (1), the fibre-reactive dyes of the formula (2) are obtained by condensing 2,4,6-trichloro-1,3,5-triazine of the formula (5) with H-acid of the formula

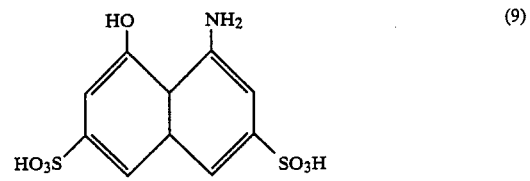

and a phenylenediaminesulphonic acid of the formula

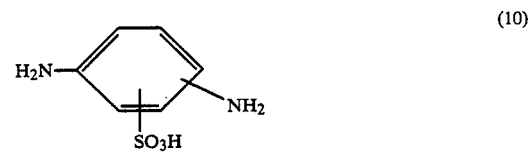

coupling to the resultant secondary condensation product of the formula

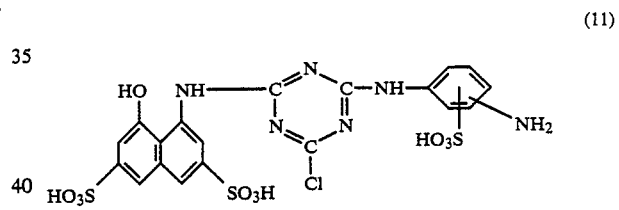

a diazotised amine of the formula

wherein $D_1$ is the radical of a diazo component of the benzene or naphthalene series, condensing the resultant azo compound of the formula

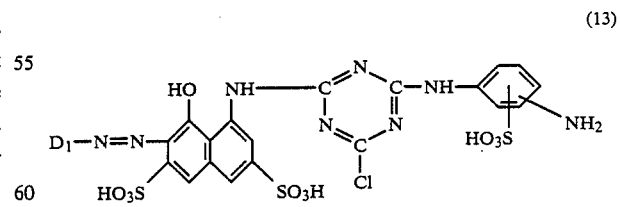

with 2,4,6-trifluoro-1,3,5-triazine of the formula (7), and condensing the condensation product resulting therefrom with a compound of the formula (8), wherein A is an amino group, to give a fibre-reactive dye of the formula

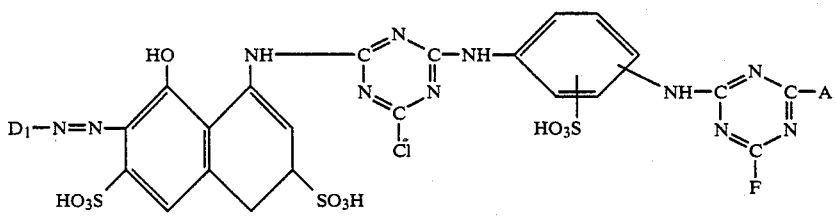
(2)

wherein $D_1$ and A have the above meanings.

The useful fibre-reactive dyes of the formula (3) are obtained in analogous manner by condensing 2,4,6-trichloro-1,3,5-triazine of the formula (5) with H-acid of the formula (9), condensing the resultant primary condensation product with a phenylenediaminesulphonic acid of the formula (10), coupling a diazotised aminobenzenesulfonic acid of the formula

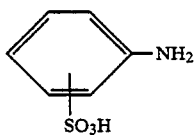
(14)

to the secondary condensation product, condensing the azo compound resulting therefrom with 2,4,6-trichloro-1,3,5-triazine of the formula (7), and condensing the condensation product thereby obtained with an aminobenzenesulphonic acid of the formula (14) to give a fibre-reactive dye of the formula

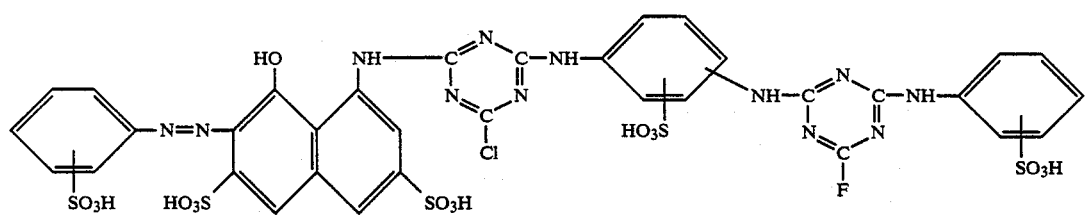
(3)

As starting materials for the manufacture of the fibre-reactive dyes of the formula (1) there may be cited:
(a) Organic dyes of the formula (4) which contain sulpho groups
1. Monoazo compounds of the formula

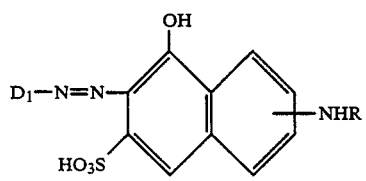
(15)

wherein $D_1$ is an at most bicyclic aryl radical which contains no azo groups and —NHR groups, R is a hydrogen atom or an alkyl group and the —NHR group is preferably bonded to the 5-, 6-, 7- or 8-position of the naphthalene nucleus, and which can contain a sulphonic acid group in the 5- or 6-position of the naphthalene nucleus.

$D_1$ can be a radical of the naphthalene or benzene series which does not contain an azo substituent, for example a stilbene, diphenyl, benzthiazolylphenyl or diphenylamino radical. In this class, attention is also drawn to the related dyes in which the —NHR group, instead of being bonded to the naphthalene nucleus, is bonded to a benzoylamino or anilino group which is bonded to the 5-, 6-, 7- or 8-position of the naphthalene nucleus.

Particularly useful starting dyes are those wherein $D_1$ is a sulphonated phenyl or naphthyl radical, especially those which contain a —SO$_3$H group in the ortho-position to the azo bond, and the phenyl radical can be further substituted, for example by halogen atoms, such as chlorine atoms, alkyl groups, such as methyl groups, acylamino groups, such as acetylamino groups, and alkoxy groups, such as methoxy groups.

2. Disazo compounds of the formula (15), wherein $D_1$ is a radical of the azobenzene, azonaphthalene or phenylazonaphthalene series and the naphthalene nucleus is substituted by the —NHR group and, if desired, by sulphonic acid, as in class 1.

3. Monoazo compounds of the formula (16)

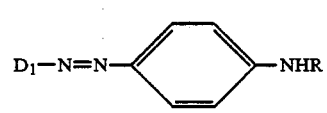

wherein $D_1$ is an at most bicyclic aryl radical, as described in class 1, and preferably a disulphonaphthyl radical or a stilbene radical, R is a hydrogen atom or an alkyl group, and the benzene nucleus can contain further substituents, such as halogen atoms or alkyl, alkoxy, carboxylic acid and acylamino groups.

4. Monoazo or disazo compounds of the formula

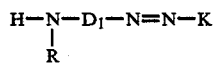
(17)

wherein $D_1$ is an arylene radical, such as a radical of the azobenzene, azonaphthalene or phenylazonaphthalene series or, preferably, an at most bicyclic arylene radical of the benzene or naphthalene series and K is the radical of a naphtholsulphonic acid or the radical of an enolised or enolisable ketomethylene compound (such as an acetoacetarylide or a 5-pyrazolone) with the OH group in the ortho-position to the azo group, and R is a hydrogen atom or an alkyl group. $D_1$ preferably is a radical of the benzene series which contains a sulphonic acid group.

5. Monoazo or disazo compounds of the formula $$D_1-N=N-K_1-NHR \qquad (18)$$

wherein $D_1$ is a radical of the types defined for $D_1$ in classes 1 and 2 above and $K_1$ is the radical of an enolisable ketomethylene compound (such as an acetoacetarylide or a 5-pyrazolone) with the OH group in the ortho-position to the azo group.

6. The metal complex compounds, for example the copper complexes, chromium complexes and cobalt complexes, of the dyes of the formulae (15) to (18), wherein each of $D_1$, K and $K_1$ has the indicated meaning, and furthermore a metallisable group (for example a hydroxyl, lower alkoxy or carboxylic acid group) is present in the ortho-position to the azo group in $D_1$.

EXAMPLES

Class 1:

6-Amino-1-hydroxy-2-(2'-sulphophenylazo)-naphthalene-3-sulphonic acid, 6-methylamino-1-hydroxy-2-(4'-acetylamino-2'-sulphophenylazo)-naphthalene-3-sulphonic acid, 8-amino-1-hydroxy-2-(2'-sulphophenylazo)-naphthalene-3,6-disulphonic acid, 8-amino-1-hydroxy-2-(4'-chloro-2'-sulphophenylazo)-naphthalene-3,5-disulphonic acid, 7-amino-2-(2',5'-disulphophenylazo)-1-hydroxynaphthalene-3-sulphonic acid, 7-methylamino-2-(2'-sulphophenylazo)-1-hydroxynaphthalene-3-sulphonic acid, 7-methylamino-2-(4'-methoxy-2'-sulphophenylazo)-1-hydroxynaphthalene-3-sulphonic acid, 8-(3'-aminobenzoylamino)-1-hydroxy-2-(2'-sulphophenylazo)-naphthalene-3,6-disulphonic acid, 8-amino-1-hydroxy-2,2'-azonaphthalene-1',3',5',6-tetrasulphonic acid, 8-amino-1-hydroxy-2,2'-azonaphthalene-1',3,5'-trisulphonic acid, 6-amino-1-hydroxy-2,2'-azonaphthalene-1',3,5'-trisulphonic acid, 6-methylamino-1-hydroxy-2,2'-azonaphthalene-1',3,5'-trisulphonic acid, 7-amino-1-hydroxy-2,2'-azonaphthalene-1',3-disulphonic acid, 8-amino-1-hydroxy-2-(4'-hydroxy-3'-carboxyphenylazo)-naphthalene-3,6-disulphonic acid and 6-amino-1-hydroxy-2-(4'-hydroxy-3'-carboxyphenylazo)-naphthalene-3,5-disulphonic acid.

Class 2:

8-amino-1-hydroxy-2-[4'-(2''-sulphophenylazo)-2'-methoxy-5'-methylphenylazo]-naphthalene-3,6-disulphonic acid, 8-amino-1-hydroxy-2-[4'-(4''-methoxyphenylazo)-2'-carboxyphenylazo]-naphthalene-3,6-disulphonic acid, 8-amino-1-hydroxy-2-[4'-(2''-hydroxy-3'',6''-disulpho-1''-naphthylazo)-2'-carboxyphenylazo]-naphthalene-3,6-disulphonic acid, 4,4'-bis-(8''-amino-1''-hydroxy-3'',6''-disulpho-2''-naphthylazo)-3,3'-dimethoxydiphenyl and 6-amino-1-hydroxy-2-[4'-(2''-sulphophenylazo)-2'-methoxy-5'-methylphenylazo]-naphthalene-3,5-disulphonic acid.

Class 3:

2-(4'-amino-2'-methylphenylazo)-naphthalene-4,8-disulphonic acid, 2-(4'-amino-2'-acetylaminophenylazo)-naphthalene-5,7-disulphonic acid, 4-nitro-4'-(4''-methylaminophenylazo)-stilbene-2,2'-disulphonic acid, 4-nitro-4'-(4''-amino-2''-methyl-5''-methoxyphenylazo)-stilbenze-2,2'-disulphonic acid, 4-amino-4'-(4''-methoxyphenylazo)-stilbene-2,2'-disulphonic acid, and 4-amino-2-methylazobenzene-2',5'-disulphonic acid.

Class 4:

1-(2',5'-dichloro-4'-sulphophenyl)-3-methyl-4-(3''-amino-4''-sulphophenylazo)-5-pyrazolone, 1-(4'-sulphophenyl)-3-carboxy-4-(4''-amino-3''-sulphophenylazo)-5-pyrazolone, 1-(2'-methyl-5'-sulphophenyl)-3-methyl-4-(4''-amino-3''-sulphophenylazo)-5-pyrazolone, 1-(2'-sulphophenyl)-3-methyl-4-(3''-amino-4''-sulphophenylazo)-5-pyrazolone, 4-amino-4'-(3''-methyl-1''-phenyl-4''-pyrazol-5''-onylazo)-stilbene-2,2'-disulphonic acid, 4-amino-4'-(2''-hydroxy-3'',6''-disulpho-1''-naphthylazo)-stilbene-2,2'-disulphonic acid, 8-acetylamino-1-hydroxy-2-(3'-amino-4'-sulphophenylazo)-naphthalene-3,6-disulphonic acid, 7-(3'-sulphophenylamino)-1-hydroxy-2-(4'-amino-2'-carboxyphenylazo)-naphthalene-3-sulphonic acid, 8-phenylamino-1-hydroxy-2-(4''-amino-2'-sulphophenylazo)-naphthalene-3,6-disulphonic acid and 6-acetylamino-1-hydroxy-2-(5'-amino-2'-sulphophenylazo)-naphthalene-3-sulphonic acid.

Class 5:

1-(3'-aminophenyl)-3-methyl-4-(2',5'-disulphophenylazo)-5-pyrazolone, 1-(3'-aminophenyl)-3-carboxy-4-(2'-carboxy-4'-sulphophenylazo)-5-pyrazolone, 4-amino-4'-[3''-methyl-4''-(2''',5'''-disulphophenylazo)-1'''-pyrazol-5''-onyl]-stilbene-2,2'-disulphonic acid and 1-(3'-aminophenyl)-3-carboxy-4-[4''-(2''',5'''-disulphophenylazo)-2''-methoxy-5''-methylphenylazo]-5-pyrazolone.

Class 6:

The copper complex of 8-amino-1-hydroxy-2-(2'-hydroxy-5''-sulphophenylazo)-naphthalene-3,6-disulphonic acid, the copper complex of 6-amino-1-hydroxy-2-(2'-hydroxy-5'-sulphophenylazo)-naphthalene-3-sulphonic acid, the copper complex of 6-amino-1-hydroxy-2-(2'-hydroxy-5'-sulphophenylazo)-naphthalene-3,5-disulphonic acid, the copper complex of 8-amino-1-hydroxy-2-(2'-hydroxy-3'-chloro-5'-sulphophenylazo)-naphthalene-3,6-disulphonic acid, the copper complex of 6-methylamino-1-hydroxy-2-(2'-carboxy-5'-sulphophenylazo)-naphthalene-3-sulphonic acid, the copper complex of 8-amino-1-hydroxy-2-[4'-(2''-sulphophenylazo)-2'-methoxy-5'-methylphenylazo]-naphthalene-3,6-disulphonic acid, the copper complex of 6-amino-1-hydroxy-2-[4'-(2'',5''-disulphophenylazo)-2'-methoxy-5'-methylphenylazo]-naphthalene-3,5-disulphonic acid, the copper complex of 1-(3'-amino-4'-sulphophenyl)-3-methyl-4-[4''-(2''''-5''''-disulphophenylazo)-2''-methoxy-5''-methylphenylazo]-5-pyrazolone, the copper complex of 7-(4'-amino-3'-sulphoanilino)-1-hydroxy-2-[4''-(2''',5'''-disulphophenylazo)-2''-methoxy-5''-methylphenylazo]-naphthalene-3-sulphonic acid, the copper complex of 6-(4'-amino-3'-sulphoanilino)-1-hydroxy-2-(2''-carboxyphenylazo)-naphthalene-3-sulphonic acid, the 1,2-chromium complex of 7-amino-6'-nitro-1,2'-dihydroxy-2,1'-azonaphthalene-3,4-disulphonic acid, the 1,2-chromium complex of 6-amino-1-hydroxy-2-(2'-carboxyphenylazo)-naphthalene-3-sulphonic acid, the 1,2-chromium complex of 8-amino-1-hydroxy-2-(4'-nitro-2'-hydroxyphenylazo)-naphthalene-3,6-disulfonic acid, the 1,2-cobalt complex of 6-(4'-amino-3'-sulphoanilino)-1-hydroxy-2-(5''-chloro-2'-hydroxyphenylazo)-naphthalene-3-sulphonic acid, the 1,2-chromium complex of 1-(3'-amino-4'-sulphophenyl)-3-methyl-4-(2''-hydroxy-4''-sulpho-1''-naphthylazo)-5-pyrazolone, the 1,2-chromium complex of 7-(4'-sulphoanilino)-1-hydroxy-2-(4''-amino-2''-carboxyphenylazo)-naphthalene-3-sulphonic acid and the 1,2-chromium complex of 1-(3'- aminophenyl)-3-methyl-4-(4″-nitro-2″-carboxyphenylazo)-5-pyrazolone.

Particularly important azo dyes which can be used for the manufacture of the fibre-reactive dyes of the formula (1) are the azo dyes of the formulae

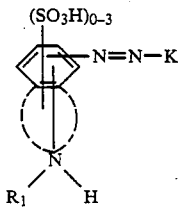
(19)

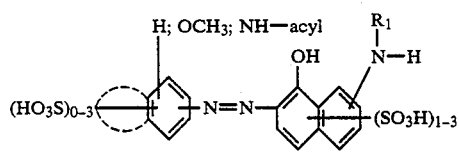
(20)

and

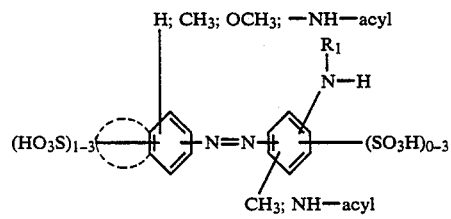
(21)

wherein K is the radical of a coupling component of the benzene, naphthalene or heterocyclic series, acyl is a low molecular aliphatic acyl radical of not more than 3 carbon atoms or an aromatic radical of not more than 8 carbon atoms and $R_1$ is as defined in formula (1), and the metal complex azo dyes of the formulae

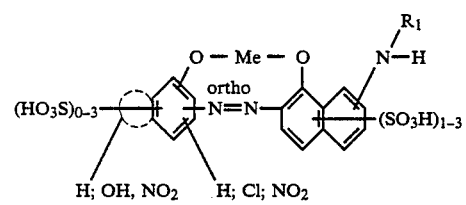
(22)

and

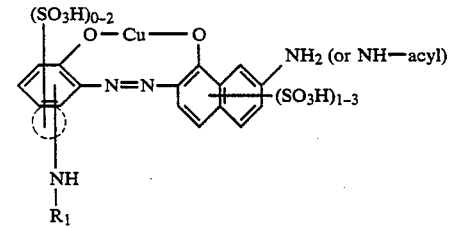
(23)

wherein $R_1$ and acyl are as defined in the formulae (19), (20) and (21) and Me represents Cu, Cr or Co.

7. Anthraquinone compounds which contain a group of the formula —NHR, wherein R is a hydrogen atom or an alkyl group, bonded to an alkylamino or arylamino group, which is itself bonded to the α-position of the anthraquinone nucleus, in particular of the formula

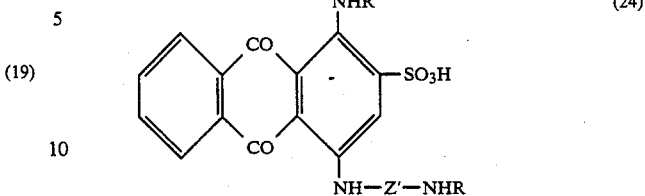
(24)

wherein the anthraquinone nucleus can contain an additional sulphonic acid group in the 5-, 6-, 7- or 8-position and Z′ is a bridge member which is preferably a divalent radical of the benzene series, for example a phenylene, diphenylene or 4,4′-stilbene or azobenzene radical. Preferably Z′ should contain one sulphonic acid group for each benzene ring present.

Examples 1-amino-4-(4′-aminianiline)-anthraquinone-2,3′-disulphonic acid and the corresponding 2,3′,5-, 2,3′,6- and 2,3′,7-trisulphonic acids, 1-amino-4-(4″-amino-4′-benzoylaminoaniline)-anthraquinone-2,3-disulphonic acid and the corresponding 2,3′,5-trisulphonic acid, 1-amino-4-[4′-(4″-aminophenylazo)-anilino]-anthraquinone-2,2″,5-trisulphonic acid, 1-amino-4-(4′-amino-3′-carboxyanilino)-anthraquinone-2,5-disulphonic acid, 1-amino-4-(3′-aminoanilino)-anthraquinone-2,4′,5-trisulphonic acid and the corresponding 2,4-disulphonic acid, 1-amino-4-[′-(4″-aminophenyl)-anilino]-anthraquinone-2,3″,5-trisulphonic acid, 1-amino-4-(4′-methylamino)-anilinoanthraquinone-2,3′-disulphonic acid and the corresponding 2,3′,5-trisulphonic acid, 1-amino-4-(4′-n-butylamino)-anilinoanthraquinone-2,3′-disulphonic acid, 1-amino-4-(4′-methylamino-3′-carboxyanilino)-anthraquinone-2-sulphonic acid, 1-amino-4-(3′-β-hydroxyethylamino)-anilinoanthraquinone-2,5-disulphonic acid, 1-(4′-aminoanilino)-anthraquinone-2,3′-disulphonic acid and 1-amino-4-(4′-amino-2′-methoxyanilino)-anthraquinone-2,3′-disulphonic acid.

8. Phthalocyanine compounds of the formula

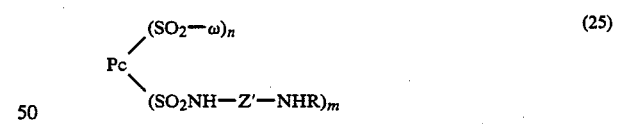
(25)

wherein Pc denotes a phthalocyanine nucleus, preferably copper phthalocyanine, ω is —OH and/or —NH₂, Z′ is a bridge member, preferably an aliphatic, cycloaliphatic or aromatic bridge, and each of n and m is 1, 2 or 3 and can be identical or different, provided that the sum of n+m is not greater than 4.

The dye compounds of the phthalocyanine series which can be used as starting materials in the process of the invention are preperably metal-containing phthalocyanines, such as copper phthalocyanines, which contain at least one water-solubilising group, such as a sulphonic acid group, and at least one group of the formula —NHR, wherein R is a hydrogen atom or an alkyl group. The —NHR group or groups can be bonded directly or through a divalent bridge to the benzene rings of the phthalocyanine nucleus, for example through a -phenylene-, —CO-phenylene-, —SO₂- phenylene-, —NH-phenylene-, —S-phenylene-, —O-phenylene-, —CH₂S-phenylene-, —CH₂O-phenylene-, —CH₂-phenylene-, —SCH₂-phenylene-, —SO₂CH₂-phenylene-, —SO₂NR₁-phenylene-, —CH₂—, —SO₂NR₁-arylene, —NR₁CO-phenylene-, —NR₁SO₂-phenylene-, —SO₂O-phenylene-, —CH₂—, —CH₂NR₁-phenylene-, —CH₂NH—CO-phenylene-, —SO₂NR₁-alkylene-, —CH₂NR₁-alkylene-, —CONR₁-phenylene-, —CONR₁-arylene-, —SO₂— or —CO— bridge. In the above divalent bridge members, R₁ is a hydrogen atom, an alkyl or cycloalkyl group, arylene denotes a divalent aromatic radical which is optionally substituted, for example by halogen atoms, alkyl or alkoxy groups, and wherein the terminal bonds may be attached to identical or different nuclei, and alkylene denotes a divalent aliphatic radical which can include heteroatoms, such as nitrogen, in the chain of atoms, for example the radical —CH₂CH₂—NH—CH₂CH₂—.

As examples of such divalent aromatic radicals, which are referred to as arylene, there may be mentioned: aromatic nuclei, for example a benzene, naphthalene, acridine and carbazole nucleus, which can carry further substituents, and radicals of the formula

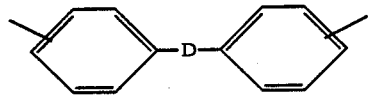
(26)

wherein the benzene rings can carry further substituents and —D— denotes a bridging group, for example —CH=CH—, —NH—, —S—, —O—, —SO₂—, —NO=N—, —N=N—, —NH—CO—NH—CO—NH—, —O—CH₂CH₂O— or

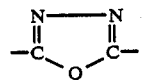
(27)

Examples 3-(3'-amino-4'-sulphophenyl)-sulphamyl-copper phthalocyanine-tri-3-sulphonic acid, di-4-(3'-amino-4'-sulphophenyl)-sulphamyl-copper phthalocyanine-di-4-sulphonic acid, 3-(3'-aminophenylsulphamyl)-3-sulphamyl-copper phthalocyanine-di-3-sulphonic acid, copper phthalocyanine-4-N-(4-amino-3-sulphophenyl)-sulphonamide-4',4''',4''''-trisulphonic acid, cobalt phthalocyanine-4,4'-di-N-(4'-amino-4'-sulphophenyl)-carboxamide-4'',4'''-dicarboxylic acid, and copper-4-(4'-amino-3'-sulphobenzoyl)-phthalocyanine. Mixtures of phthalocyanines can also be used. For example, a mixture of approximately equal parts of copper phthalocyanine-N-(4-amino-3-sulphophenyl)-sulphonamide-trisulphonic acid and copper phthalocyanine-di-N-(4-amino-3-sulphophenyl)-sulphonamide-disulphonic acid can be used.

9. Nitro dyes of the formula

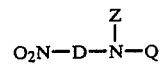
(28)

wherein D is a naphthalene or benzene nucleus which can be further substituted, the nitrogen atom N is in the ortho-position to the nitro group, Z is a hydrogen atom or an optionally substituted hydrocarbon radical and Q is a hydrogen atom or an organic radical bonded to the nitrogen through a carbon atom, and wherein Q and Z are not both hydrogen atoms, and Q can be bonded to Z, if Z is a hydrocarbon radical, or can be bonded to D in the ortho-position to the nitrogen atom N to form a heterocyclic ring, and which contain at least one group of the formula —NHR, wherein R is a hydrogen atom or an alkyl group, in particular nitro dyes of the formula

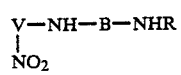
(29)

wherein V and B are monocyclic aryl nuclei and the nitro group in V is in the ortho-position to the NH group.

Example

4-Amino-2'-nitro-diphenylamine-3,4'-disulphonic acid.

9. Metal complexes of formazane dyes of the formula

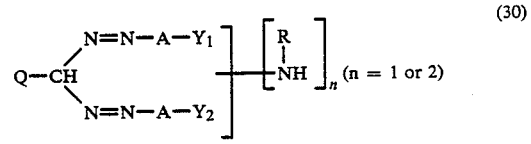
(30)

wherein Q is an organic radical, a nitro or cyano group, A and B are radicals of diazo components of the benzene, naphthalene or heterocyclic series and each of Y₁ and Y₂ is a substituent which is bound in the ortho-position to the azo group and which is able to form a complex with a heavy metal, and R has the indicated meaning. The radical Q is chiefly a radical of the benzene series, such as phenyl or sulphophenyl, or a low molecular alkyl group, such as a methyl group, a low molecular alkanoyl group, a low molecular, preferably C₁-C₄-carbalkoxy group, a benzoyl group or a heterocyclic radical, and A and B are preferably phenyl radicals which are substituted by sulpho, sulphonamido or alkylsulphonyl groups. Suitable substituents Y₁ and Y₂ are above all the hydroxyl and carboxyl groups. Suitable heavy metals are copper, chromium, cobalt and nickel.

Examples:

The copper complex of 2'-carboxy-2''-hydroxy-3''-amino-1,3,5-triphenylformazane-4',5'',3'''-trisulphonic acid, the copper complex of 2',2''-dihydroxy-3'-amino-5'-methylsulphonyl-1,3,5-triphenyl-3'',5'',4'''-trisulphonic acid, the copper complex of 2'-carboxy-4'-amino-2''-hydroxy-1,3,5-triphenylformazane-3'',5'',2'''-trisulphonic acid, the copper complex of 2'-hydroxy-2''-carboxy-4'''-amino-1,3,5-triphenylformazane-4'-4''-disulphonic acid, the copper complex of 2',2''-dihydroxy-5''-amino-1,5-diphenyl-3-methylformazane-5',3''-disulphonic acid, the copper complex of 2',2'',dihydroxy-5'-amino-1,3,5-triphenylformazane-3',3'',5''-trisulphonic acid, the copper complex of 2'-carboxy-3'-amino-2''-hydroxy-3''''(1'''''-phenyl-3''''-methyl-pyrazol-5''''-onyl-4''''-azo)-1,3,5-triphenylformazane-3'',5'',2'''',5'''''-tetrasulphonic acid. the nickel complex of 2',2''-dicarboxy-1,5-diphenyl-3-(m-aminobenzoyl)-formazane-4',4''-disulphonic acid.

(b) 2,4,6-Trichloro-1,3,5-triazine of the formula (5), cyanuric chloride (c) Alkylene- and arylenediamines of the formula (6)

ethylenediamine,
n-propylenediamine,
n-butylenediamine,
1-methyl-n-propylenediamine,
n-hexylenediamine,
1,3-diaminobenzene, 1,4-diaminobenzene,
1,3-diamino-4-chlorobenzene, 1,3-diamino-4-methylbenzene,
1,3-diamino-4-methoxybenzene,
2,6-diamino-4-methoxybenzene,
2,6-diaminonaphthalene-4,8-disulphonic acid,
1,4-diaminobenzene-2-sulphonic acid,
1,4-diaminobenzene-2,5-disulphonic acid,
1,3-diaminobenzene-4-sulphonic acid,
1,4-diaminobenzene-2-carboxylic acid,
1,4-diaminobenzene-4-carboxylic acid,
1,4-diamino-2-methylbenzene,
4,4'-diaminodiphenylurea-2,2'-disulphonic acid,
4,4'-diaminodiphenyloxyethane-2,2'-disulphonic acid,
4,4'-diaminostilbene-2,2'-disulphonic acid,
4,4'-diaminodiphenylethane-2,2'-disulphonic acid.

(d) 2,4,6-Trifluoro-1,3,5-triazine of the formula (7) (Cyanuric fluoride)

(e) Compounds of the formula (8)

1. Amines:
   ammonia,
   hydroxylamine,
   hydrazine,
   phenylhydrazine,
   sulphophenylhydrazine,
   methylamine,
   ethylamine,
   propylamine,
   isopropylamine,
   butylamine,
   β-methoxyethylamine,
   γ-methoxypropylamine,
   N,N-dimethylamine,
   N,N-diethylamine,
   N-methyl-N-phenylamine,
   N-ethyl-N-phenylamine,
   benzylamine,
   cyclohexylamine,
   morpholine,
   piperidine,
   aniline,
   toluidine,
   xylidine,
   chloroaniline,
   anisidine,
   phenetidine,
   sulphanilic acid,
   metanilic acid,
   aminobenzylsulphonic acid,
   aniline-ω-methanesulphonic acid,
   m-aminobenzoic acid,
   p-aminobenzoic acid,
   2-amino-4-sulphobenzoic acid,
   2-amino-5-sulphobenzoic acid,
   1-naphthylamine-4-sulphonic acid.
2. Alcohols:
   methanol,
   ethanol,
   propanol,
   iso-propanol,
   butanol,
   pentanol,
   hexanol,
   β-methoxyethanol,
   β-ethoxyethanol.
3. Alkylmercaptanes
   methylmercaptan,
   ethylmercaptan.

As diazotisable aromatic amines and couplable compounds which can be used according to the above described process modifications (a) and (b) for the manufacture of fibre-reactive dyes of the formula (1), wherein D is the radical of an azo dye which contains sulpho groups, there may be mentioned:
aniline, o-, m- and p-toluidines, o-, m- and p-anisidines, o-, m- and p-chloroanilines, 2,5-dichloroaniline, α- and β-naphthylamine, 2,5-dimethylaniline, 5-nitro-2-aminoanisole, 4-aminodiphenyl, aniline-2-, -3- and -4-carboxylic acids, 2-aminodiphenyl ether, 2-, 3- or 4-aminobenzenesulphonamide or -sulphomonomethylamide or -sulphoethylamide or -sulphodimethylamide or -sulphodiethylamide, dehydrothio-p-toluidinemonosulphonic acid or dehydrothio-p-toluidinedisulphonic acid, aniline-2-, -3- and -4-sulphonic acids, aniline-2,4- or -2,5-disulphonic acid, 2,4-dimethylaniline-6-sulphonic acid, 3-aminobenzotrifluoride-4-sulphonic acid, 4-chloro-5-methylaniline-2-sulphonic acid, 5-chloro-4-methylaniline-2-sulphonic acid, sulphoanthranilic acid, 3-acetylaminoaniline-6-sulphonic acid, 4-acetylaminoaniline-2-sulphonic acid, 4-chloroaniline-2-sulphonic acid, 3,4-dichloroaniline-6-sulphonic acid, 4-methylaniline-2-sulphonic acid, 3-methylaniline-6-sulphonic acid, 2,4-dimethoxyaniline-6-sulphonic acid, 4-methoxyaniline-2-sulphonic acid and 5-methoxyaniline-2-sulphonic acid, 2,5-dichloroaniline-4-sulphonic acid, 2-naphthylamine-4,8- and -6,8-disulphonic acid, 1-naphthylamine-2-, -4-, -5-, -6- or -7-monosulphonic acid, 1-naphthylamine-3,6-disulphonic acid, 2-naphthylamine-1-sulphonic acid, 2-naphthylamine-1,5-, 3,6- and -5,7-disulphonic acid, 2-naphthylamine-3,6,8-trisulphonic acid, m- and p-nitroaniline, 4-nitroaniline-2-sulphonic acid, 3-nitroaniline-6-sulphonic acid, m- or p-aminoacetanilide and 4-amino-2-acetylaminotoluene-5-sulphonic acid.

Coupling Components

Phenol-4-sulphonic acid, β-naphthol, 2-naphthol-6- or -7-sulphonic acid, 2-naphthol-3,6- or -6,8-disulphonic acid, 1-naphthol-4-sulphonic acid, 1-phenyl-3-methyl-5-pyrazolone, 1-(4'-sulphophenyl)-3-methyl-5-pyrazolone, 1-(2',5'-dichloro-4'-sulphophenyl)-3-methyl)-3-methyl-5-pyrazolone, 3-aminocarbonyl-4-methyl-6-hydroxypyridone-2, 1-ethyl-3-cyano- or 3-chloro-4-methyl-6-hydroxypyridone-2, 1-ethyl-3-sulphomethyl-4-methyl-6-hydroxypyridone-2, 2,4,6-triamino-3-cyanopyridine, 2-(3'-sulphophenylamino)-4,6-diamino-3-cyanopyridine, 2-(2'-hydroxyethylamino)-3-cyano-4-methyl-6-aminopyridine, 2,6-bis(2'-hydroxyethylamino)-3-cyano-4-methylpyridine, 2-benzoylamino-5-naphthol-7-sulphonic acid, 1-benzoylamino-8-naphthol-3,6- or -4,6-disulphonic acid, phenol, p-cresol, acetoacetanilide and acetoacetic-2-methoxyanilide-5-sulphonic acid, 1-(4'-sulphophenyl)-pyrazolone-(5)-3-carboxylic acid, 3-methylpyrazolone-(5), 4-hydroxyquinolone-(2), 8-acetylamino-1-naphthol-3-sulphonic acid, 2-aminophthalene-5,7-disulphonic acid, 1-naphthol-4,6- or -4,7-disulphonic acid.

The condensation reactions of the 2,4,6-trichloro-1,3,5-triazine of the formula (5) and the 2,4,6-trifluoro-1,3,5-triazine of the formula (7) with the dyes of the formula (4) which contain sulpho groups, the alkylene- or arylenediamines of the formula (6) and the amines of the formula (8) and the diazotisable or couplable components which contain a

group, are carried out preferably in an aqueous solution or suspension, at low temperature and at a weakly acid, neutral to weakly alkaline pH value. Advantageously, the hydrogen fluoride liberated during the condensation is continuously neutralised by adding aqueous alkali hydroxides, carbonates or bicarbonates. The diazotisation of the intermediates which contain a diazotisable amino group takes place as a rule by the action of nitrous acid in aqueous-mineral acid solution at low temperature, and the coupling is effected at weakly acid, neutral to weakly alkaline pH values.

It is advisable to rinse the dyeings and prints thoroughly with cold and hot water, if appropriate with the addition of an agent which acts as a dispersant and promotes the diffusion of non-fixed dye.

In the following Examples, the parts and percentages are by weight.

EXAMPLE 1

31.4 Parts of 8-amino-1-naphthol-3,6-disulphonic acid are condensed initially with 18.5 parts of 2,4,6-trichloro-1,3,5-triazine. The primary condensation product obtained is then condensed with 21 parts of sodium 1,4-diaminobenzene-3-sulphonate and the resultant condensation product is coupled at pH 7 to 8 with a diazo compound prepared from 17.3 parts of 1-aminobenzene-2-sulphonic acid. To the red dye solution are then added dropwise, at 0° to 5° C., 13.6 parts of 2,4,6-trifluoro-1,3,5-triazine while keeping the pH at 6.5 by simultaneously adding 2N sodium hydroxide solution. When the condensation is complete, an aqueous solution of 19.5 parts of the sodium salt of 1-aminobenzene-3-sulphonic acid is added, the temperature is raised to 20° C. and the hydrogen fluoride which is liberated during the condensation is continuously neutralised by the dropwise addition of 2N sodium hydroxide solution. The dye of the formula

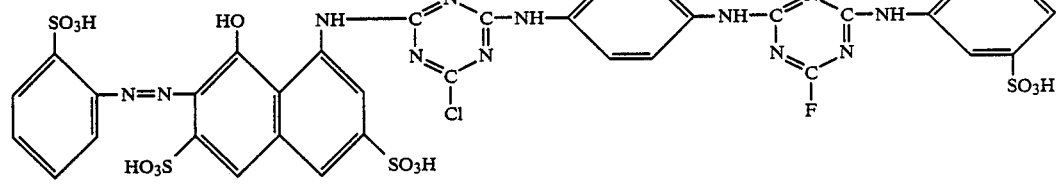

(31)

The dyes of the formula (1) are characterised by a pronounced reactivity. They are suitable for dyeing and printing a very wide variety of materials, such as silk, leather, wool, polyamide fibres and polyurethanes, but especially cellulosic materials of fibrous structure, such as linen, cellulose, regenerated cellulose, and chiefly cotton. They are suitable both for the exhaustion process and for dyeing by the pad-dyeing process, in which the goods are impregnated with aqueous and, if appropriate, also with salt-containing dye solutions, and the dyes are fixed after treatment with alkali or in the presence of alkali, optionally with the application of heat.

They are also suitable for printing, in particular on cotton, and also for printing nitrogen-containing fibres, for example wool, silk or blends containing wool.

is isolated from the red solution by sprinkling in sodium chloride. It dyes cellulose fibres in wetfast, brilliant red shades.

Red dyes with similar properties are also obtained by using an equivalent amount of 1-aminobenzene-4-sulphonic acid or 2-amino-5-sulphobenzoic acid for the final condensation instead of 1-aminobenzene-3-sulphonic acid. Dyes with similar properties are obtained by using instead of 8-amino-1-hydroxynaphthalene-3,6-disulphonic acid equivalent amounts of the compounds listed in column 2 of Table 1, instead of 1,4-diaminobenzene-3-sulphonic acid equivalent amounts of the compounds listed in column 4, and finally, instead of 1-aminobenzene-3-sulphonic acid equivalent amounts of the compounds listed in column 5.

TABLE 1

| No. | Coupling component | Diamine | Diazo component | Amine | Shade on cotton |
|---|---|---|---|---|---|
| 2 | 1-amino-8-hydroxy-naphthalene-3,6-di sulphonic acid | 1,2-diamino-ethane | 1-aminobenzene-2,5-disulphonic acid | 1-aminobenzene-3-sulphonic acid | red |
| 3 | 1-amino-8-hydroxy-naphthalene-3,6-di-sulphonic acid | 1,3-diamino-benzene-4-sulphonic acid | 2-aminonaphthalene-1,5-di sulphonic acid | 1-amino-2-methylbenzene | red |
| 4 | 1-amino-8-hydroxy-naphthalene-4,6-di-sulphonic acid | 1,3-diamino-benzene-4-sulphonic acid | 1-aminobenzene-2,4-disulphonic acid | " | red |
| 5 | 1-amino-8-hydroxy-naphthalene-3,6-di-sulphonic acid | 1,3-diamino-benzene-4-sulphonic acid | 2-aminonaphthalene-1-sulphonic acid | 1-aminobenzene-3-sulphonic acid | bluish red |
| 6 | 1-(4'-aminobenzoyl-amino)-8-hydroxy-naphthalene-3,6-di- | 1,3-diamino-benzene-4-sulphonic acid | 2-aminonaphthalene-1,5-disulphonic acid | 1-aminobenzene-3-sulphonic acid | red |

TABLE 1-continued

| No. | Coupling component | Diamine | Diazo component | Amine | Shade on cotton |
|---|---|---|---|---|---|
| | sulphonic acid | | | | |
| 7 | 2-amino-5-hydroxy-naphthalene-1,7-disulphonic acid | 1,4-diamino-benzene-3-sulphonic acid | 1-aminobenzene-2-sulphonic acid | 1-aminobenzene-4-sulphonic acid | orange |
| 8 | 2-amino-5-hydroxy-naphthalene-7-sulphonic acid | 1,3-diamino-benzene-4-sulphonic acid | 1-aminobenzene-2,5-disulphonic acid | 1-amino-2-methyl-enzene | orange |
| 9 | 2-amino-5-hydroxy-naphthalene-7-sulphonic acid | 1,2-diamino-ethane | 1-aminobenzene-2-sulphonic acid | 1-aminobenzene-3-sulphonic acid | orange |
| 10 | 2-amino-5-hydroxy-naphthalene-7-sulphonic acid | 1,3-diamino-benzene-4-sulphonic acid | 2-aminonaphthalene-1,5-disulphonic acid | 1-aminobenzene-3-sulphonic acid | orange |
| 11 | 2-amino-8-hydroxy-naphthalene-6-sulphonic acid | 1,3-diamino-benzene-4-sulphonic acid | 2-aminonaphthalene-1,5-disulphonic acid | 1-aminobenzene-4-sulphonic acid | yellowish red |

EXAMPLE 2

31.4 Parts of 8-amino-naphthol-3,6-disulphonic acid are condensed with cyanuric chloride at 0° C. and pH 1 to 2. To the suspension of the primary condensation product is added an aqueous solution of 21 parts of the sodium salt of 2,4-diaminobenzenesulphonic acid and condensation is effected at a pH of 4 to 5. When the condensation is complete, the secondary condensation product is coupled at pH 6 to 6.5 with the diazo compound obtained from 18.7 parts of 2-amino-5-methyl-benzenesulphonic acid. The red dye solution is then added to a suspension of 2-(2'-sulphophenylamino)-4,6-difluoro-1,3,5-triazine prepared by condensing 17.3 parts of 2-aminobenzenesulphonic acid with 13.5 parts of 2,4,6-trifluoro-1,3,5-triazine at 0° C. The hydrogen fluoride liberated during the condensation is neutralised continously by adding sodium carbonate solution. When the condensation is complete, the reaction product is isolated in the form of a red powder by evaporating the water under reduced pressure. The dye colours cellulose fibres in fast, bluish red shades.

Dyes with similar colouristic properties are obtained by using the following difluorotriazinyl compounds instead of 2-(2'-sulphophenylamino)-4,6-difluoro-1,3,5-triazine for the final condensation step:

| No. | Difluorotriazinyl derivative | Parts |
|---|---|---|
| 1 | 2-methoxy-4,6-difluoro-1,3,5-triazine | 14.7 |
| 2 | 2-ethoxy-4,6-difluoro-1,3,5-triazine | 16.1 |
| 3 | 2-(2'-methylphenylamino)-4,6-difluoro-1,3,5-triazine | 22.2 |
| 4 | 2-methylthio-4,6-difluoro-1,3,5-triazine | 16.3 |
| 5 | 2-(2'-ethoxyethoxy)-4,6-difluoro-1,3,5-triazine | 20.5 |
| 6 | 2-isopropoxy-4,6-difluoro-1,3,5-triazine | 19.1 |
| 7 | 2-n-butylamino-4,6-difluoro-1,3,5-triazine | 18.2 |
| 8 | 2-(2',5'-disulphophenylamino)-4,6-difluoro-1,3,5-triazine | 36.8 |
| 9 | 2-diethylamino-4,6-difluoro-1,3,5-triazine | 18.8 |
| 10 | 2-(2'-methyl-5'-sulphophenylamino)-4,6-difluoro-1,3,5-triazine | 30.2 |
| 11 | 2-(2'-carboxy-4'-sulphophenylamino)-4,6-difluoro-1,3,5-triazine | 33.2 |
| 12 | 2-(4'-methyl-2'-sulphophenylamino)-4,6-difluoro-1,3,5-triazine | 30.2 |
| 13 | 2-(2'-chloro-5'-sulphophenylamino)-4,6-difluoro-1,3,5-triazine | 32.4 |
| 14 | 2-(2',4'-disulphophenylamino)-4,6-difluoro-1,3,5-triazine | 36.8 |
| 15 | 2-n-butoxy-4,6-difluoro-1,3,5-triazine | 18.9 |

EXAMPLE 3

9.42 Parts of 6-amino-1-naphthol-3,5-disulphonic acid are condensed with 5.55 parts of cyanuric chloride. The primary condensation product is condensed with 6.3 parts of 1,4-diaminobenzene-2-sulphonic acid, then 4.05 parts of 2,4,6-trifluoro-1,3,5-triazine are added dropwise at 0° C. to the solution of the secondary condensation product while keeping the pH at 7 by the dropwise addition of 2N sodium hydroxide solution. When the condensation is complete, 4.5 parts of 25% aqueous ammonia solution are added and the batch is stirred for 4 hours at 15° to 20° C. To the resultant solution of the coupling component of the formula

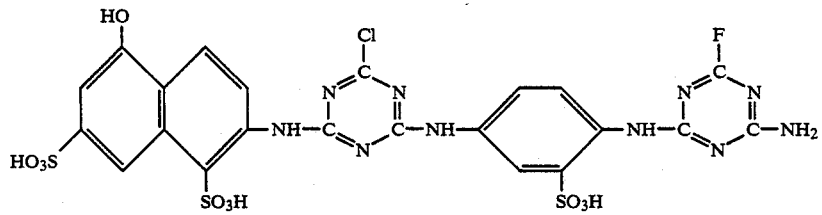

is then added a suspension of the diazonium compound prepared from 5.19 parts of 2-aminobenzene-1-sulphonic acid in the conventional manner and coupling is performed at a pH of 6 to 7. When the coupling is complete, the dye is precipitated by adding sodium chloride. After the dye has been dried and ground, a dye powder is obtained with which cellulose fabrics can be dyed from an aqueous bath in fast orange shades. Instead of the condensation with 2,4,6-trifluoro-1,3,5-triazine and subsequent reaction with ammonia, condensation can also be effected with 2-amino-4,6-difluoro-1,3,5-triazine. The dye so obtained is identical with that described above.

Dyes which dye cellulose fibres in the shades indicated in column 6 of Table 2 are obtained by using instead of 6-amino-1-naphthol-3,5-disulphonic acid equivalent amounts of the compounds listed in column 2, instead of 1,4-diaminobenzene-2-sulphonic acid the compounds listed in column 3, instead of ammonia the compounds listed in column 4, and finally, instead of 2-aminobenzene-1-sulphonic acid the diazo compounds listed in column 5.

duced uniformly into a well stirred solution of 13.05 parts of the sodium salt of 2-amino-5-hydroxynaphthalene-7-sulphonic acid. The pH value is kept constant at 8.5 during the addition. When the coupling is complete,

TABLE 2

| No. | Coupling Component | Diamine | Amine | Diazo component | Shade on cotton |
|---|---|---|---|---|---|
| 1 | 1-(6'-amino-4'-8'-di-sulphonaphth-2'-yl)-3-methylpyrazolone-(5) | 1,3-diamino-4-methyl-benzene | 1-aminobenzene-4-sulphonic acid | 1-aminobenzene-2,5-disulphonic acid | yellow |
| 2 | 8-amino-1-naphthol-3,6-disulphonic acid | 1,4-diaminobenzene | 1-aminobenzene-3-sulphonic acid | 2-aminonaphthalene-1,5-disulphonic acid | red |
| 3 | 8-amino-1-naphthol-3,6-disulphonic acid | 1,4-diaminobutane | 1-aminobenzene-3-sulphonic acid | 2-aminobenzene-1-sulphonic acid | red |
| 4 | 8-amino-1-naphthol-3,6-disulphonic acid | 1,4-diaminobenzene-2-sulphonic acid | 1-amino-2-methylbenzene | 2-aminobenzene-1-sulphonic acid | red |
| 5 | 8-amino-1-naphthol-3,6-disulphonic acid | 1,4-diaminobenzene-2-carboxylic acid | dimethylamine | 2-aminobenzene-1-sulphonic acid | red |
| 6 | 8-amino-1-naphthol-3,6-disulphonic acid | 4,4'-diaminodiphenyl-ethane-2,2-disulphonic acid | morpholine | 2-aminonaphthalene-6,8-disulphonic acid | red |
| 7 | 8-amino-1-naphthol-3,6-disulphonic acid | 1,4-diaminobenzene-2-sulphonic acid | aniline | 2-amino-5-methylbenzene-1-sulphonic acid | red |
| 8 | 8-amino-1-naphthol-3,6-disulphonic acid | 1,4-diaminobenzene-2-sulphonic acid | 4-aminobenzoic acid | 4-chloroaniline-2-sulphonic acid | red |
| 9 | 8-amino-naphthol- | 1,4-diaminobenzene-2-sulphonic acid | 1-amino-4-ethoxybenzene | 4-aminobenzoic acid | red |
| 10 | 8-amino-1-naphthol-3,5-disulphonic acid | 1,3-diamino-4-methoxy-benzene | methylamine | 2-aminobenzene-1-sulphonic acid | red |
| 11 | 8-amino-1-naphthol-3,5-disulphonic acid | 2,6-diaminonaphthalene-4,8-disulphonic acid | diethanolamine | 2-aminobenzene-1-sulphonic acid | red |
| 12 | 8-(4'-aminobenzoyl-amino)-1-naphthol-3,6-disulphonic acid | 1,3-diaminobenzene-4-sulphonic acid | 4-sulphophenylhydrazine | 2-aminobenzene-1-sulphonic acid | red |
| 13 | 2-amino-5-naphthol-7-sulphonic acid | 1.3-diaminobenzene-4-sulphonic acid | 1-aminobenzene-3-sulphonic acid | 1-aminobenzene-2,4-disulphonic acid | orange |
| 14 | 2-amino-5-naphthol-7-sulphonic acid | 1.3-diaminobenzene-4-sulphonic acid | 1-aminobenzene-3-sulphonic acid | 2-aminoaphthalene3,6,8-trisulphonic acid | scarlet |
| 15 | 2-amino-5-naphthol-7-sulphonic acid | 1,3-diaminobenzene acid | 2-amino-5-sulphobenzoic trisulphonic acid | 2-aminonaphthalene-3,6,8- | scarlet |
| 16 | 8-amino-1-naphthol-3,6-disulphonic acid | 1,3-diaminobenzene | 1-aminonaphthalene-4-sulphonic acid | 4-aminobenzoic acid | red |
| 17 | 2-methylamino-5-naphthol-7-sulphonic acid | 1,4-diaminobenzene-2-sulphonic acid | 1-aminobenzene-3-sulphonic acid | 2-aminobenzene-1-sulphonic acid | orange |
| 18 | 2-methylamino-5-naphthol-7-sulphonic acid | 1,4-diaminobenzene-2-sulphonic acid | 1-Aminobenzene-3-sulphonic acid | 2-amino-5-methoxybenzene-1-sulphonic acid | scarlet |
| 19 | 2-methylamino-5-naphthol-7-sulphonic acid | 1,3-diaminobenzene-4-sulphonic acid | 1-aminobenzene-4-sulphonic acid | 2-amino-5-methoxybenzene-1-sulphonic acid | scarlet |

EXAMPLE 4

12.56 Parts of 8-amino-1-naphthol-3,6-disulphonic acid are condensed as described in Example 2 with 7.4 parts of cyanuric chloride and the condensation product is coupled with the diazo compound obtained from 6.92 parts of 1-aminobenzene-2-sulphonic acid. A solution of 8.4 parts of the sodium salt of 1,4-diaminobenzene-3-sulphonic acid is then added and condensation is effected at 10° to 12° C. while keeping the pH of the solution at 6 by adding 2N sodium hydroxide solution. To the red dye solution are then added dropwise, at 0° C., 5.44 parts of 2,4,6-trifluoro-triazine while keeping the pH at 6.5 by simultaneously adding 2N sodium hydroxide solution. When the condensation is complete, an aqueous solution of 9.5 parts of 2-amino-5-sulphobenzoic acid is added and the batch is stirred for 3 hours at 20° to 25° C. while neutralising continuously with 2N sodium hydroxide solution the hydrogen fluoride liberated during the condensation. The entire dye solution is spray dried to yield a dark red dye powder with which strong red shades are obtained on cellulose fibers from an aqueous bath.

EXAMPLE 5

10.15 Parts of 2-amino-5-methoxybenzenesulphonic acid are diazotised and the resultant suspension is introduced uniformly into a well stirred solution of 13.05 parts of the sodium salt of 2-amino-5-hydroxynaphthalene-7-sulphonic acid. The pH value is kept constant at 8.5 during the addition. When the coupling is complete, a solution of 9.5 parts of cyanuric chloride in acetone is added at 0° C. and the reaction mixture is stirred at 0° C. until condensation is complete while keeping the pH at 6.5 by simultaneously adding 2N sodium hydroxide solution. Then a solution of 10.8 parts of 1,3-diaminobenzene in water is added and condensation is effected further at room temperature and the same pH value. The intermediate dye formed is precipitated by sprinkling in sodium chloride, collected by filtration and dissolved in water again at 0° C. Then 6.75 parts of 2,4,6-trifluoro-1,3,5-triazine are added dropwise to this solution in the course of 20 minutes while keeping the pH at 7 by simultaneously adding 2N sodium hydroxide solution. When the condensation is complete, 4.5 parts of morpholine are added and the mixture is further stirred at 0° to 5° C. and a pH of 8.5 until the condensation is complete. The dye is precipitated from the aqueous dye solution by sprinkling in potassium chloride. It dyes cotton in wetfast scarlet shades. Further reactive dyes are obtained in accordance with the particulars of this Exammple by reacting the aminoazo dye formed from the components and listed in column 2 of Table 3 with cyanuric chloride, then effecting condensation first with the diamine of column 3, cyanuric fluoride, and finally with the amine of column 4. The dyes obtained dye cotton or regenerated cellulose fibres in the shade indicated in the last column of the table.

TABLE 3

| No. | Aminoazo dye | Diamine | Amine | Shade |
|---|---|---|---|---|
| 1 | 2-amino-4-acetylaminobenzenesulphonic acid→1-naphthol-4,7-disulphonic acid (saponiflied) | 1,4-phenylenediamine-3-sulphonic acid | N—methylethanolamine | scarlet |
| 2 | 2-naphthylamine-3,6,8-trisulphonic→1-amino-3-ureidobenzene | 1,4-phenylenediamine-3-sulphonic acid | 1-aminobenzene-3-sulphonic acid | reddish yellow |
| 3 | 2-amino-4-acetylaminobenzenesulphonic acid→1-ethyl-3-sulphomethyl-4-methyl-6-hydroxypridone-(2) (saponified) | 1,4-phenylenediamine-3-sulphonic acid | ammonia | greenish yellow |
| 4 | 2-naphthylamine-4,6,8-trisulphonic acid→aniline→aniline | 1,3-diamino-4-methyl-benzene | 1-aminobenzene-3-sulphonic acid | orange |
| 5 | 2-amino-5-nitrobenzenesulphonic acid→1-(2',5'-dichloro-4'-sulphophenyl)-3-methylpyrazolone-(5) (reduced) | 1,4-diaminobenzene | diethylamine | yellow |
| 6 | 1-aminbgenzene-2-sulphonic acid→4-amino-1-hydroxy-naphthalene-3-sulphonic acid | 1,4-phenylenediamine-3-sulphonic acid | aminobenzene | orange |
| 7 | 2-amino-5-methoxybenzenesulphonic acid→6-methyl-amino-1-hydroxynaphthalene-3-sulphonic acid | 1,4-phenylenediamine-3-sulphonic acid | 2-aminotoluene | scarlet |
| 8 | 2-aminobenzenesulphonic acid→1-amino-8-hydroxy-naphthalene-3,6-disulphonic acid | 4,4'-diaminostilbene-2,2'-disulphonic acid | 2-aminotoluene-5-sulphonic acid | red |
| 9 | 2-naphthylamine-4,8-disulphonic acid→1-amino-3-methylbenzene | 1,4-phenylenediamine-3-sulphonic acid | N—ethylameinobenzene | yellow |
| 10 | 1-aminobenzene-2,5-disulphonic acid→1-(3'-amino-phenyl)-3-carboxypyrazolone-(5) | 1,4-phenylendiamine-3-sulphonic acid | 2-amino-5-sulphobenzoic acid | yellow |
| 11 | 1-aminobenzene-2-sulphonic acid→8-(4'-nitrobenzoyl-amino)-1-naphthol-3,6-disulphonic acid (reduced) | 1,4-diaminobutane | 1-aminobenzene-4-carboxylic acid | red |
| 12 | 2-amino-5-methylbenzenesulphonic acid→6-ethyl-amino-1-naphthol-3-sulphonic acid | 1,4-phenylenedimaine-3-sulphonic acid | 1-aminobenzene-3-sulphonic acid | orange |
| 13 | 2-aminonaphthalene-1,5-disulphonic acid→6-acetyl-amino-1-naphthol-3-sulphonic acid (saponified) | 1,4-phenylenediamine-3-sulphonic acid | 1-aminobenzene-3-sulphonic acid | orange |
| 14 | 2-aminonaphthalene-3,6,8-trifulphonic acid→6-amino-1-naphthol-3-sulphonic acid | 1,4-phenylenediamine-3-sulphonic acid | N—sulphomethylaniline | scarlet |

EXAMPLE 6

17.3 Parts of 1-aminobenzene-2-sulphonic acid are dissolved in water while adding 50 parts by volume of a 2N sodium hydroxide solution. The solution is cooled at 0° C., 10 parts of sodium hydrogen carbonate are added and then 13.5 parts of 2,4,6-trifluoro-1,3,5-triazine are added dropwise in the course of 15 minutes. When the condensation is complete, a solution of 21 parts of the sodium salt of 1,3-diaminobenzene-6-sulphonic acid is added while neutralising continuously with 2N sodium hydroxide the hydrogen fluoride which is formed during the condensation. As soon as no more 1,3-diaminobenzene-6-sulphonic acid can be detected, the reaction mixture is cooled again to 0° C., a solution of 18.5 parts of 2,4,6-trichloro-1,3,5-triazine in 50 parts by volume of acetone is added thereto and the batch is stirred at 0° C. whlie keeping the pH at 6 to 7. When all the trichlorotriazine is consumed, a solution of the aminoazo dye of the formula

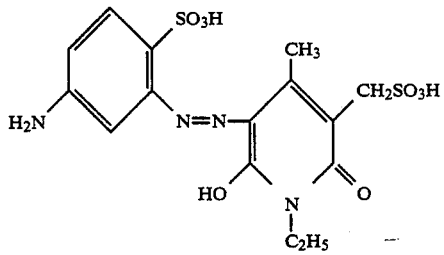

(49 parts of neutral sodium salt)

is added, the mixture is warmed to 25°-30° C. and condensation is effected at a pH of 6 to 7, this value being maintained by continuously adding 2N sodium hydroxide solution. The reactive dye of the formula

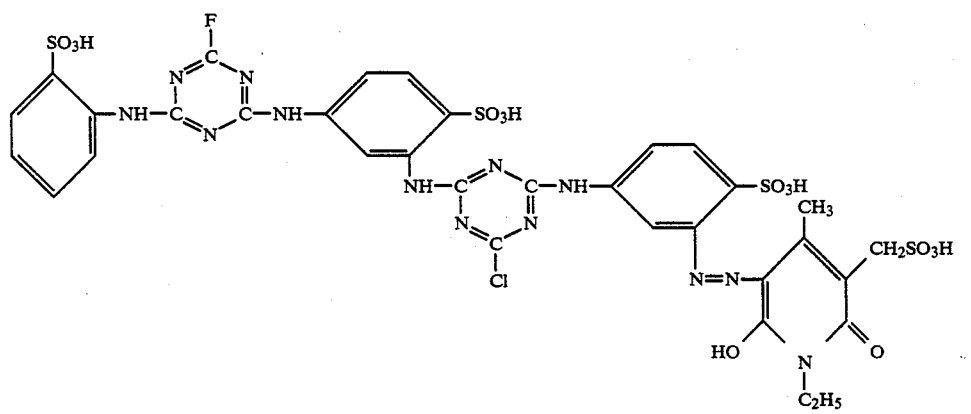

(33)

is isolated from the yellow solution by sprinkling in sodium chloride, dried and ground to yield a yellow dye powder with which cellulose fibres are dyed in brilliant, wetfast yellow shades.

Dyes of similar properties are obtained by carrying out the above procedure, but using instead of 1-aminobenzene-2-sulphonic acid equivalent amounts of the components listed in column 2 of Table 4, instead of 1,3-diaminobenzene-6-sulphonic acid equivalent parts of the compounds listed in column 3, and instead of the aminoazo-pyridone dye equivalent amounts of the amino dyes listed in column 4.

EXAMPLE 7

187 Parts of 4-amino-3-methylbenzenesulphonic acid are dissolved neutral in water while adding 100 parts by volume of a 40% solution of sodium hydroxide. The solution is cooled to 0° C. with ice, 14 parts of disodium hydrogen phosphate are added and then 135 parts of 2,4,6-trifuoro-1,3,5-triazine are added dropwise in the

TABLE 4

| No. | Aminobenzene-sulphonic acid | Diamine | Amino dye | Shade on cellulose |
|---|---|---|---|---|
| 1 | 1-aminobenzene-2-sulphonic acid | 1,3-diaminobenzene-4-sulphonic acid | 1-amino-3-acetylaminobenzene-6-sulphonic acid⟶1-(2',5'-dichloro-4'-sulphophenyl)-3-methyl-pyrazolone-(5), (saponified) | yellow |
| 2 | 1-aminobenzene-2,4-disulphonic acid | 1,3-diaminobenzene-3-sulphonic acid | 1-amino-3-acetylaminobenzene-6-sulphonic acid⟶1-(4',8'-disulphonaphthyl-2'-)-3-methyl-pyrazolone-(5), (saponified) | yellow |
| 3 | 1-aminobenzene-2,5-disulphonic acid | 1,3-diaminobenzene-4-sulphonic acid | 2-(4'-amino-2'-ureidophenylazo)-naphthalene-3,6,8-trisulphonic acid | yellow |
| 4 | 1-amino-2-methyl-benzene-4-sulphonic acid | 1,3-diaminobenzene-4-sulphonic acid | 2-(4'-amino-2'-acetylaminophenylazo)-naphthalene-4,8-disulphonic acid | yellow |
| 5 | 1-aminobenzene-2,4-disulphonic acid | 1,3-diaminobenzene-4-sulphonic acid | 1-amino-3-nitrogenzene-6-sulphonic acid⟶2-acetylamino-5-hydroxynaphthalene-7-sulphonic acid, (reduced) | orange |
| 6 | 1-amino-2-methyl-benzene-5-sulphonic acid | 1,4-diaminobenzene-3-sulphonic acid | 1-amino-3-nitrobenzene-6-sulphonic acid⟶2-sulphoacetylamino-8-hydroxynaphthalene-6-sulphonic acid, (reduced) | yellowish red |
| 7 | 1-aminobenzene-2-sulphonic acid | 1,4-diaminobenzene-3-sulphonic acid | 1-amino-3-acetylaminobenzene-6-sulphonic acid⟶1-hydroxynaphthalene-3,6-disulphonic acid | reddish orange |
| 8 | 1-amino-2-methyl-benzene-4-sulphonic acid | 1,3-diaminobenzene-4-sulphonic acid | 1-aminobenzene-2,4-disulphonic acid⟶1-(3'-nitrobenzoylamino)-8-hydroxynaphthalene-3,6-disulphonic acid, (reduced) | red |
| 9 | 1-aminobenzene-2,5-disulphonic acid | 1,3-diaminobenzene-4-sulphonic acid | 2-aminonaphthalene-1,5-disulphonic acid⟶1-(4'-nitrobenzoylamino)-8-hydroxynaphthalene-3,6-disulphonic acid, (reduced) | red |
| 10 | 1-aminobenzene-2,4-disulphonic acid | 1,4-diaminobenzene-3-sulphonic acid | 1-amino-3-nitrobenzene-6-sulphonic acid⟶1-benzoylamino-8-hydroxynaphthalene-4,6-disulphonic acid, (reduced) | red |
| 11 | 1-aminobenzene-2,5-disulphonic acid | 1,3-diaminobenzene-4-sulphonic acid | 1-amino-4(2'-methyl-3'-amino-anilino)-anthraquinone-2,5'-disulphonic acid | blue |
| 12 | 1-aminobenzene-2,5-disulphonic acid | 1,4-diaminobenzene-3-sulphonic acid | 1-amino-4-(4'-N—methylaminomethyl-anilino)-anthraquinone-2,2'-disulphonic acid | blue |
| 13 | 1-aminobenzene-2-sulphonic acid | 1,3-diaminobenzene-4-sulphonic acid | 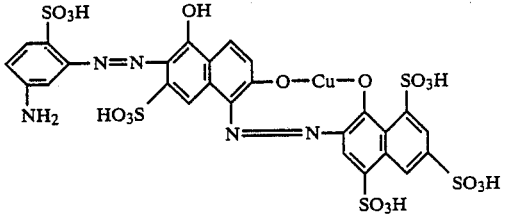 | reddish blue |
| 14 | 1-aminobenzene-2,5-disulphonic acid | 1,3-diaminobenzene-4-sulphonic acid | 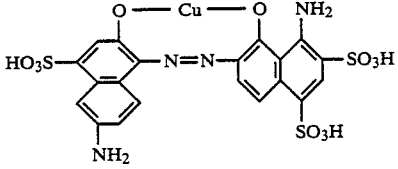 | blue |
| 15 | 2-aminobenzene-1-sulphonic acid | 1,4-diaminobenzene-3-sulphonic acid | 2-amino-1-hydroxynaphthalene-4,8-disulphonic acid⟶8-amino-1-hydroxynaphthalene-3,6-disulphonic acid, Cu—complex | blue |
| 16 | 2-aminobenzene-1-sulphonic acid | 1,4-diaminobenzene-3-sulphonic acid | 3-(3'-aminophenylsulphamyl)-3-sulphamyl-copper phthalocyanine di-2-sulphonic acid | greenish blue |
| 17 | 1-aminobenzene-2,5-disulphonic acid | 1,2-diaminoethane | 4-amino-2'-nitrophenylamine-3,4'-disulphonic acid | yellow |
| 18 | 1-aminobenzene-2,5-disulphonic acid | 1,4-diamino-3-methylbenzene | 2'-carboxy-4'-amino-2''-hydroxy-1,3,5-triphenylformazane-3'',5'',2'''-trisulphonic acid, Cu—complex | blue | course of 15 minutes while mixing the solution thoroughly. The pH of the reaction mixture is kept at 7 by simultaneously adding 2N sodium hydroxide solution. When the condensation is complete, a solution of 210 parts of the sodium salt of 1,3-diaminobenzene-6-sulphonic acid is added and the mixture is stirred at 10° to 15° C. whilst neutralising continuously the hydrogen fluoride which forms during the condensation by dropping in 2N sodium solution. As soon as no more 1,3-diaminobenzene-6-sulphonic acid can be detected, 185 parts of ground cyanuric chloride are added and condensation is carried out at pH 6 to 7 until no more cyanuric chloride can be detected. An aqueous solution of 210 parts of the sodium salt of 1,3-diaminobenzene-6-sulphonic acid is added once more and further condensation is effected at a temperature of 15° C. and pH 6. To the resultant solution are then added 250 parts by volume of a 4N sodium nitrite solution and after cooling to 0° C., 250 parts by volume of 32% hydrochloric acid are tipped in. Any excess nitrous acid is destroyed by adding sulphamic acid and then 361 parts of 8-acetylamino-1-hydroxynaphthalene-3,6-disulphonic acid are added to the diazo compound and the pH of the solution is gradually raised to 7 by adding sodium hydroxide solution. A deep red solution s obtained from which the dye is obtained in the form of a red powder by adding sodium chloride, collecting the precipitate by suction filtration and drying and grinding it. The dye colours cellulose textile material in brilliant, wetfast red shades. Further useful reactive dyes which dye cotton in the indicated shades are obtained by using the coupling components listed in the following table instead of 8-acetylamino-1-hydroxynaphthalene-3,6-disulphonic acid.

| No. | Coupling Component | Shade |
|---|---|---|
| 1 | 1-hydroxynaphthalene-4-sulphonic acid | scarlet |
| 2 | 1-(4'-sulphophenyl)-3-methylpyrazolone-(5) | yellow |
| 3 | 1-ethyl-3-cyano-4-methyl-6-hydroxypyridone-(2) | yellow |
| 4 | 1,4-dimethyl-3-sulphomethyl-6-hydroxy-pyridone-(2) | yellow |
| 5 | 2-(3'-sulphophenylamino)-4,6-diamino-3-cyanopyridine | orange |
| 6 | 8-benzoylamino-1-hydroxynaphthalene-3,6-disulphonic acid | red |
| 7 | 1-hydroxynaphthalene-4,7-disulphonic acid | scarlet. |

DYEING PROCEDURE I

2 Parts of the dye obtained according to Example 1 are dissolved in 100 parts of water while adding 0.5 part of sodium m-nitrobenzenesulphonate. A cotton fabric is impregnated with the resultant solution to a liquor pick-up of 75% and then dried.

The fabric is then impregnated with a warm solution of 20° C. which contains, per liter, 5 g of sodium hydroxide and 300 g of sodium chloride, and squeezed out to a pick-up of 75%. The dyeing is steamed for 1 minute at 100° to 101° C., soaped for a quarter of an hour in a 0.3% boiling solution of a non-ionic detergent, rinsed and dried.

DYEING PROCEDURE II

2 Parts of the dye obtained according to Example 1 are dissolved in 100 parts of water. The solution is added to 1900 parts of cold water, 60 parts of sodium chloride are added and 100 parts of a cotton fabric are put into this dye-bath.

The temperature is raised to 40° C. and 40 parts of calcined sodium carbonate and another 60 parts of sodium chloride are added after 30 minutes. The temperature is kept for 30 minutes at 40° C. The dyeing is rinsed and then soaped for 15 minutes in a 0.3% boiling solution of a non-ionic detergent, rinsed and dried.

We claim:

1. Fibre-reactive dye of the formula

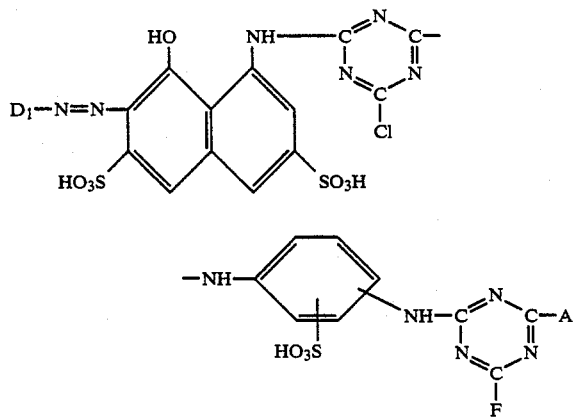

wherein $D_1$ is the radical of a diazo component of the benzene or naphthalene series and A is an amino group.

2. Fibre-reactive dye of the formula

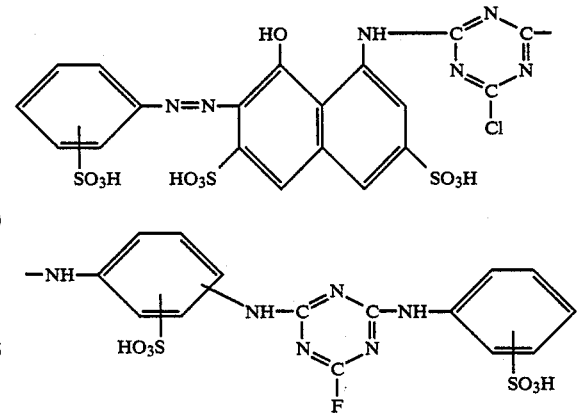

* * * * *

UNITED STATES PATENT AND TRADEMARK OFFICE
CERTIFICATE OF CORRECTION

PATENT NO. : 4,507,236

DATED : March 26, 1985

INVENTOR(S) : Herbert Seiler, et al

It is certified that error appears in the above-identified patent and that said Letters Patent is hereby corrected as shown below:

| | |
|---|---|
| Col. 6, line 7 | Delete "amino" and substitute --amine-- |
| Col. 6, line 12 | Correct spelling of "trifluoro" |
| Col. 11, line 23 | Delete "Amino" and substitute --amino-- |
| Col. 11, line 64 | Delete "stilbenze" and substitute --stilbene-- |
| Col. 13, line 10 | Delete dotted structure and substitute:  |
| Col. 13, lines, 20, 30 and 46 | Delete dotted structure and substitute: 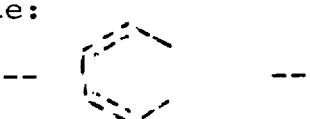 |
| Col. 13, line 45 | Beginning of structure, before "ortho" insert -- ⟶ -- as follows:  |
| Col. 13, line 57 | Delete dotted structure and substitute:  |

UNITED STATES PATENT AND TRADEMARK OFFICE
CERTIFICATE OF CORRECTION

PATENT NO. : 4,507,236

DATED : March 26, 1985

INVENTOR(S) : Herbert Seiler, et al

Page 2 of 3

It is certified that error appears in the above-identified patent and that said Letters Patent is hereby corrected as shown below:

| | |
|---|---|
| Col. 22, line 4 under "Amine" | Delete "enzene" and substitute --benzene-- |
| Col. 23, line 10 under "Diamine" | Delete "2,2" and substitute --2,2'-- |
| Col. 23, line 18 under "Coupling Component" | After "8-amino-naphthol" insert --3,6-disulphonic acid-- |
| Col. 23, line 16 under "Diamine" | After "1,4-diaminobenzene-2-" insert --sulphonic acid-- |
| Col. 23, line 28 under "Diamine" | Delete "acid" |
| Col. 23, line 21 under "Amine" | Delete "trisulphonic" |
| Col. 23, line 26 under "Amine" | Delete "Aminobenzene" and substitute --aminobenzene-- |
| Col. 23, line 29 under "Diazo component" | Insert --trisulponic acid-- |
| Col. 24, line 62 | Correct spelling of "Example" |
| Col. 25, line 2 under "Aminoazo dye" | Correct spelling of "(saponified)" |
| Col. 25, line 3 under "Aminoazo dye" | After "trisulphonic" insert --acid-- |
| Col. 25, line 11 under "Aminoazo dye" | Correct spelling of "aminobenzene" |
| Col. 26, line 12 under "Amine" | Delete "N-ethylameinobenzene" and substitute --N-methylaminobenzene-- |
| Col. 25, line 66 | Correct spelling of "while" |

UNITED STATES PATENT AND TRADEMARK OFFICE
CERTIFICATE OF CORRECTION

PATENT NO. : 4,507,236

DATED : March 26, 1985

INVENTOR(S) : Herbert Seiler, et al

It is certified that error appears in the above-identified patent and that said Letters Patent is hereby corrected as shown below:

Col. 28, 3rd line from bottom under "Amino dye"   Delete "nitrophenylamine" and substitute --nitrodiphenylamine--

Signed and Sealed this

Fifth Day of November 1985

[SEAL]

Attest:

Attesting Officer

DONALD J. QUIGG

Commissioner of Patents and Trademarks